(12) United States Patent
Hoeppler et al.

(10) Patent No.: US 12,184,757 B2
(45) Date of Patent: Dec. 31, 2024

(54) METHOD FOR PROVIDING A STATE CHANNEL

(71) Applicant: Robert Bosch GmbH, Stuttgart (DE)

(72) Inventors: Christian Hoeppler, Backnang (DE); Daniel Kunz, Erdmannhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 448 days.

(21) Appl. No.: 17/450,371

(22) Filed: Oct. 8, 2021

(65) Prior Publication Data

US 2022/0123924 A1  Apr. 21, 2022

(30) Foreign Application Priority Data

Oct. 15, 2020 (DE) .......................... 102020213017.5

(51) Int. Cl.
| | |
|---|---|
| *H04L 9/08* | (2006.01) |
| *H04L 9/14* | (2006.01) |
| *H04L 9/30* | (2006.01) |

(52) U.S. Cl.
CPC .............. *H04L 9/0819* (2013.01); *H04L 9/14* (2013.01); *H04L 9/30* (2013.01)

(58) Field of Classification Search
CPC ............ H04L 9/0819; H04L 9/14; H04L 9/30
See application file for complete search history.

(56) References Cited

U.S. PATENT DOCUMENTS

| | | | | |
|---|---|---|---|---|
| 2017/0337552 | A1* | 11/2017 | Mandal | G06Q 20/326 |
| 2018/0343126 | A1* | 11/2018 | Fallah | H04L 9/3297 |
| 2019/0243988 | A1* | 8/2019 | Khi | G06F 16/903 |
| 2019/0333030 | A1* | 10/2019 | Ramasamy | G06Q 20/3674 |
| 2020/0073698 | A1* | 3/2020 | Wu | G06F 16/2379 |
| 2020/0076571 | A1* | 3/2020 | Natarajan | H04L 9/50 |
| 2020/0127828 | A1* | 4/2020 | Liu | H04L 9/30 |
| 2020/0160320 | A1* | 5/2020 | Williams | H04L 9/0897 |
| 2021/0126769 | A1* | 4/2021 | Soundararajan | H04L 9/3239 |
| 2022/0337436 | A1* | 10/2022 | Beaudet | G06F 9/45558 |

OTHER PUBLICATIONS

Stefan et al. "General State Channel Networks", Oct. 2018. p. 949-966. (Year: 2018).*

(Continued)

*Primary Examiner* — Yonas A Bayou
(74) *Attorney, Agent, or Firm* — NORTON ROSE FULBRIGHT US LLP; Gerard A. Messina

(57) ABSTRACT

A method for providing a state channel between a first entity and a second entity in a network for exchanging messages relating to transactions of a distributed ledger technology, which each possess a decentralized identifier and instructions for handling the decentralized identifier in the network, for establishing the state channel according to a peer-to-peer protocol for decentralized identifiers for the first and the second entity. A new decentralized identifier as a user identifier and a public key for the particular user identifier are exchanged in each case between the first and second entity, and the exchange of messages containing pieces of information characterizing states between the first and the second entity being secured with the aid of the user identifiers and the public keys.

11 Claims, 1 Drawing Sheet

(56) References Cited

OTHER PUBLICATIONS

Stefan et al. "Perun: Virtual Payment Hubs over Cryptocurrencies", 2019, p. 106-123. (Year: 2019).*
Preukschat et al., "Self-Sovereign Identity," Manning, 2020, pp. 1-504.
Hardman et al., "Peer Did Method Specification," 2020, pp. 1-62. <https://identity.foundation/peer-did-method-spec/> Downloaded Oct. 6, 2021.

* cited by examiner

METHOD FOR PROVIDING A STATE CHANNEL

CROSS REFERENCE

The present application claims the benefit under 35 U.S.C. § 119 of German Patent Application No. DE 102020213017.5 filed on Oct. 15, 2020, which is expressly incorporated herein by reference in its entirety.

FIELD

The present invention relates to a method for providing a state channel, and a computer system, a network, and a computer program for carrying out the method.

BACKGROUND INFORMATION

The term "distributed ledger technology" refers to a form of database systems which are distinguished by joint and synchronized data storage in a peer-to-peer network and progressive cryptographic linking of the data. Blockchain represents one specific embodiment of this technology. Other embodiments are, for example, oriented acyclic graphs. The pieces of information are stored in blocks, chained with one another via cryptographic methods, and stored redundantly in each node of the network with the aid of peer-to-peer protocols, i.e., the same pieces of information or data are present at each user on the network. The distributed network of independent computers (nodes) which communicate with one another and synchronize for this purpose verifies and confirms these blocks via a so-called consensus mechanism. The consensus mechanism which is presently most common and which is used in the bitcoin and Ethereum blockchains is referred to as "proof of work." In addition, presently multiple alternative consensus mechanisms exist, which are each accompanied by certain advantages and disadvantages in dependence on the specific design of the DLT network.

Moreover, DLT solutions of the second generation usually offer the option of defining and using so-called "smart contracts." Program code which is written into the DLT and accordingly may be executed in a redundant or verifiable manner by all users on the DLT network is referred to as smart contracts. DLT may thus be used not only for the secure storage of data, but additionally may depict and execute business logics. With the aid of so-called "state channels," these are (secure) communication connections, it is possible to execute such "smart contracts" without communication with a relevant database ("ledger") and nonetheless to retain the warranted characteristics. As soon as a "state channel" is created or established, "smart contracts" may be concluded and executed efficiently (at best even in real time) between the creating parties.

SUMMARY

According to the present invention, a method for providing a state channel and a computer system, a network, and a computer program for carrying out the method are provided. Advantageous embodiments of the present invention are disclosed herein.

The present invention relates to providing a state channel and additionally a secure communication connection, in particular a "state channel" mentioned at the outset between a first entity and a second entity in a (for example, decentralized) network for exchanging messages relating to transactions of a distributed ledger technology using a peer-to-peer protocol for decentralized identifiers, in particular according to an SSI ("self-sovereign identity") mechanism.

In other words, the "state channel" may be referred to as a state channel which enables an exchange of messages containing states or pieces of information characterizing states between at least two parties or entities, in particular without using a or the DLT system. The "state channel" is a logical connection which uses the SSI channel as the technical connection. Therefore, different states or corresponding pieces of information may be exchanged comparatively quickly via the state channel, without corresponding transactions of the DLT system being required for this purpose. The transactions executed via the state channel may therefore also be referred to as "off-chain" transactions. For example, new status updates are exchanged; for example, in the case of a payment channel this is the digital bookkeeping.

Inspired by DLT, decentralized solutions have been developed for digital identifiers or identities including important standards such as so-called "verifiable credentials" (VC) and so-called "decentralized identifiers" (DID). These technologies may be subsumed under the term SSI ("self-sovereign identity"). The main characteristic of an SSI is a peer-to-peer approach secured by cryptography using public and private keys, which represents a paradigm change away from a user account approach involving a centralized or federated identity model.

The existing decentralized identifiers may in particular be "decentralized identifiers" (DID), which contain properties and interfaces, in particular of so-called SSI agents. This functions, for example, as a trustee of an entity (or of a proprietor of an identifier or identity), and contains, for example, cryptographic keys which embody the delegated authorization and interact, for example, with suitable protocols. The present invention is also to be explained in more detail hereinafter on the basis of this special type of communication connection, decentralized identifier, and network by way of example.

The entities may be, for example, computer systems or processing units such as computers, but also those which are associated with devices within the scope of the Internet of things (IoT). The communication in the (decentralized) network takes place using a communication interface, for example, via transport layers such as Bluetooth, WLAN, NFC, email, or other suitable protocols.

In accordance with an example embodiment of the present invention, according to a peer-to-peer protocol for decentralized identifiers for the first and the second entity, in each case a new decentralized identifier as a user identifier and a public key for the particular user identifier are exchanged between the first and second entity. The user identifiers and the public keys are preferably each part of a data set for the decentralized communication, which, for example, identifies the particular identity and which may be, for example, a so-called "DID document," and are also exchanged in particular in that the relevant data sets are exchanged. With the aid of the user identifiers and the public keys, the exchange of messages containing pieces of information characterizing states between the first and the second identity is then secured, which takes place in a completely encrypted manner.

In particular, the so-called "peer DID method" comes into consideration here as the peer-to-peer protocol, a protocol which builds on the mentioned DID and is provided especially for the peer-to-peer communication between two entities, thus without interconnecting another or central instance. Each user—in the present case the first and the second entity—is also to proceed according to the rules of this protocol. In this context, the data set may also be referred to as the "DID:peer document."

In particular, according to the "peer DID method," but also in general in a peer-to-peer protocol, an invitation (which is initially still unencrypted) to provide a state channel or a communication connection may initially be placed by the first entity to the second entity. The second entity thereupon sends a—then encrypted—connection request, for example, including the above-mentioned data set for the second entity, to the first entity. The first entity in turn sends a connection acceptance as a response, for example, including the above-mentioned data set for the first entity. The associated public key may be used in each case here as the user identifier.

In this way, the entities may agree on a secure communication connection, in particular having a certain identifier, for example, a so-called "state channel ID" (SCID) and may create the initial state, for example. The initial state includes in particular the starting situation in a state channel, for example, in a payment channel the initial balance over both entities or parties, which is to be raised in the "funding protocol." Both entities execute the corresponding setup protocol or "funding protocol" of the communication connection or the "channel." This may certainly be independent of the SSI infrastructure used or the decentralized network used, since a communication with the DLT network used is required here.

Both entities may use the secure communication network established in this way, for example, the "DID:peer" communication channel, to be able to exchange in an encrypted manner pieces of information or "states" signed using the particular key. It may be ensured in this way (in particular using the mentioned "DID:peer") that the content may only be decrypted by the particular other entity and may be validated using relevant keys.

The secure communication channel or the "state channel" may, when it is no longer required, for example, be closed or ended by one of the entities, for example, directly via the DLT with the aid of a "smart contract," this also applies to the so-called "dispute handling." This communication does not take place via the secure communication channel or the "DID:peer" between the entities.

An example embodiment of the present invention thus uses the SSI, which represents a decentralized basis for identities and which therefore functions as a so-called "common trust layer," i.e., as a layer or basis for common secure communication, and does so for greatly varying applications. Since the possibility already exists in principle via SSI of establishing a so-called "permanent connection" between two entities (cf. also in this regard Preukschat, Dreed (2020), "Self-Sovereign Identity," Manning), which are cryptographically secured and unique, this already offers "out-of-the-box" or prefinished properties which are used for the secure communication connection or the so-called "state channels," for example, unique user identifiers. State channels—in comparison to a permanent connection—are a logical direct connection with the possibility of sending transactions directly instead of via a DLT. State channels require a transport layer, in the present case, for example, the DID:peer of SSI.

Moreover, the SSI-based communication connections or communication channels are implemented as a direct connection between the entities, which also offers an added value for the "state channels," since these may use the existing connection and are therefore already secured. Moreover, certain properties may already be ensured between the entities via the SSI mechanism, for example, privacy, scaling (cf. also in this regard Daniel Hardman et al. (2020): "Peer DID Method Specification") or also "know your customer" (KYC).

At the same time, due to the specific generation of, for example, a "DID:peer" for each desired communication connection, it is more difficult to comprehend from the outside who maintains a secure communication connection or a "state channel" with whom, since the user identifier of each connection is unique. This represents a type of "key rotation." This mechanism may be used to have the protection of the private sphere managed with security guarantees achieved by cryptographic methods. For this purpose—previously—dedicated keys may be used for different application scenarios or the keys may be changed over time to prevent a connection between key and identifier (or identity). This is referred to as "key rotation" when a new pair of keys is used in a specific application over time at a defined point.

The present invention thus especially relates to the approach of establishing a "state channel" between a first entity and a second entity using a peer DID method and then exchanging messages relating to transactions of a DLT via this "state channel."

In particular, an interface between a "state channel framework" and the peer DID method used is provided for this purpose.

Such an interface is made up in particular of two parts: an "interface integration" to communicate with the SSI agent, in order to be able to send and receive messages, and an integration of the present "DID:peer" parameters, such as a unique "public ID," which is included in the DID:doc (a specification), for a state channel. This may be used as the "participant ID" (user identifier) in the "state channel." It is thus ensured with whom a "state channel" is established.

Messages specific for the "state channel" are exchanged via the interface, for example, the initial state, which also describes what each party has to provide via a DLT. Moreover, new states may also be exchanged, which occur and have to be signed by both parties.

A "state channel framework" is made up in particular of the smart contracts which run on the DLT or the like. These implement the specific protocol and sequences for how a "state channel" is established and also cover dispute cases, etc. On the other hand, the required parameters are specified which relate to a status that has to be signed by both parties to be considered valid.

The "state channel framework" executes the messages to the DLT to establish the channel. Moreover, it sends required messages, for example, a new status which has to be confirmed, to the other entity via the "DID:peer" channel.

The present invention also relates to a computer system including a communication interface which has a decentralized identifier and instructions for handling the decentralized identifier in a decentralized network, and which is configured to provide a state channel or a secure communication connection to another computer system including a communication interface via a decentralized network, the other computer system also having a decentralized identifier and instructions for handling the decentralized identifier in the decentralized network. In accordance with an example embodiment of the present invention, the computer system for establishing the state channel is configured to generate, according to a peer-to-peer protocol for decentralized identifiers, a new decentralized identifier as a user identifier and a public key for the user identifier and to transfer them to the other computer system, and to receive a decentralized identifier as a user identifier and a public key of the other computer system, and to secure a message exchange relating to the state channel with the other computer system with the aid of the user identifier and the public key. In particular, the computer system may execute all further steps carried out by one of the entities according to the above explanations.

A (decentralized) network according to the present invention includes two computer systems including a communication interface and is configured, in particular by programming, to carry out a method according to the present invention.

The present invention is suitable for providing a secured communication between two users or for providing any type of communication connections in which a more secure exchange of messages is desired or necessary. The present invention is also suitable for providing a secured communication, for example, in the case of an economic interaction between entities in which a payment has to take place.

Depending on the type of the implementation, required processes may partially be carried out manually or automatically via a so-called agent, who only has to be informed with whom a state channel is to be established. The "DID: peer" protocol is then executed first and then the remaining "state channel" protocol. Such an agent may be implemented in any processing unit as software, for example, in a control unit of any arbitrary device (in a smart device, for example, a mobile telephone or tablet PC, in domestic appliances such as refrigerators, etc., in entertainment electronics, but also in machines and facilities or vehicles).

The implementation of a method according to the present invention in the form of a computer program or computer program product including program code for carrying out all method steps is also advantageous, since this entails particularly low costs, in particular if an executing control unit is also used for further tasks and is therefore provided in any case. Suitable data media for providing the computer program are in particular magnetic, optical, and electrical memories, for example, hard drives, flash memories, EEPROMs, DVDs, etc. A download of a program via computer networks (Internet, intranet, etc.) is also possible.

Further advantages and embodiments of the present invention result from the description and the figures.

The present invention is schematically shown with the aid of an exemplary embodiment in the figures and is described hereinafter with reference to the figures.

DETAILED DESCRIPTION OF EXAMPLE EMBODIMENTS

Figure 1:
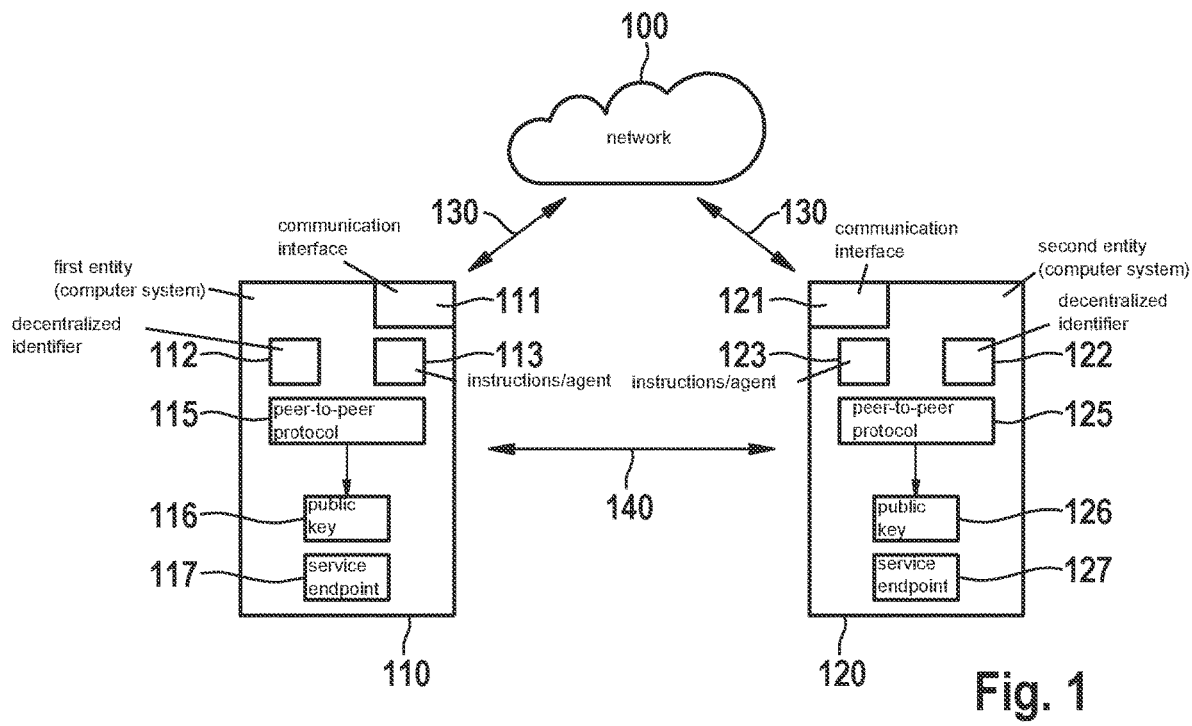
FIG. 1 schematically shows a network in which a method according to the present invention may be carried out.

FIG. 1 schematically shows a network 100, in which a method according to the present invention may be carried out and which may also be designed as a network according to the present invention in a preferred specific embodiment. Decentralized network 100 includes, for example, two computer systems 110 and 120, which are incorporated into the overall structure of network 100 with the aid of suitable communication interfaces 111 or 121 and corresponding communication connections 130. Although computer systems 110, 120 are shown separately here, they are part of network 100 (only schematically indicated here).

Network 100 may be a so-called DLT network or "distributed ledger technology" network; communication connections 130 are then accordingly DLT communication connections.

Computer systems 110 and 120, which may be considered to be first entity 110 and second entity 120 in the meaning of the present invention, each include a so-called DID as a decentralized identifier 112 or 122 and instructions or an agent 113 or 123 for handling the particular decentralized identifier in network 100 to implement an SSI mechanism. The DID does not necessarily have something to do with the DLT network to be used here; the DID may be anchored in an identity network, which may but does not have to be a DLT. The DLT shown is, for example, relevant for the state channels or smart contracts. For this purpose, for example, suitable software is executed on each of the computer systems to be able to provide or represent these functions. This software may also be used, for example, to be able to execute or implement a peer-to-peer protocol 115 or 125.

Furthermore, each computer system has a data set including at least one public key 116 or 126 and suitable "service endpoints" 117 or 127. This is, for example, a network address (for example, an HTTP URL), under which a service for the entity is executed.

Using these peer-to-peer protocols 115 or 125, computer systems 110 and 120 may establish or provide a state channel or a secure communication connection 140 or a so-called "state channel," via which a direct and encrypted communication of messages relating to the state channel is possible. The DID:peer protocol is executed here, for example, to establish a direct communication. When this is established, this connection is established as a state channel, i.e., the messages relevant for the state channel are exchanged via this channel.

Figure 2:
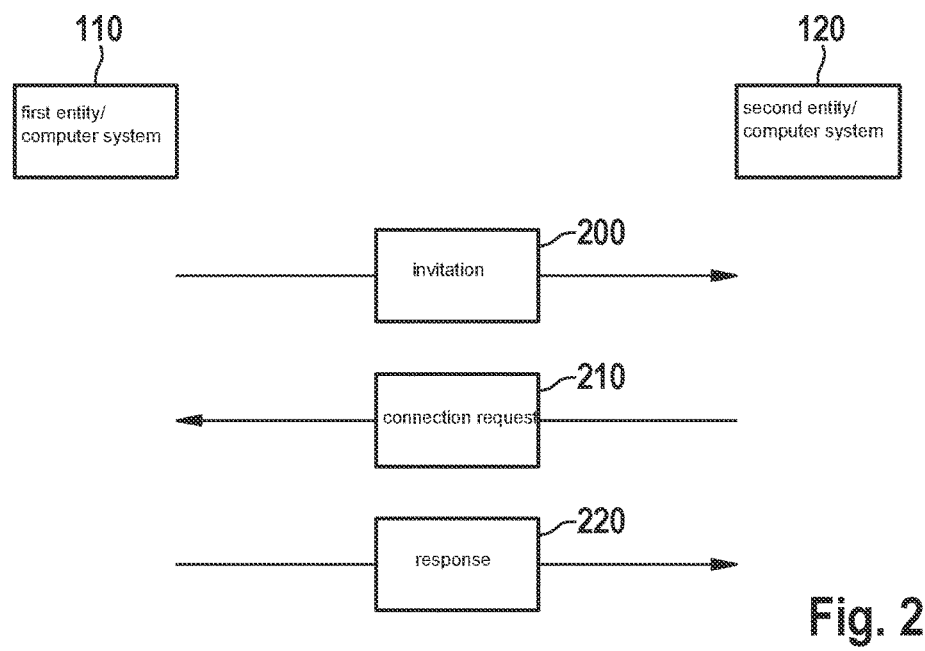
FIG. 2 schematically shows a sequence of a method according to the present invention in a preferred specific embodiment.

FIG. 2 shows a sequence of a method according to the present invention in a preferred specific embodiment for this purpose, namely in particular with regard to the establishment of the mentioned secure communication connection or the state channel. For example, an invitation 200 is transferred from first entity or computer system 110 to second entity or computer system 120, using which the establishment of a secure communication connection is requested or desired. This invitation may be transferred unsecured or unencrypted.

A connection request 210 is transferred from second entity or computer system 120 to first entity or computer system 110 if the request or the invitation is to be complied with. In particular, the data set of the second entity including the public key, which is also used as a user identifier of the second entity, is transferred hereby.

First entity or computer system 110 receives this connection request 210 and thereupon transfers a response 220. The data set of the first entity including the public key, which is also used as the user identifier of the first entity, is in particular transferred hereby.

In this way, the secure communication connection may be established, via which it is subsequently possible to communicate in a secured and encrypted manner. For this purpose, the relevant keys are used, each identity having obtained the public key of the particular other identity and thus knowing it.

What is claimed is:

1. A method for providing a state channel between a first entity and a second entity in a network for exchanging messages relating to transactions of a distributed ledger technology, wherein the first entity and the second entity each possess a decentralized identifier and instructions for handling the decentralized identifier in the network, the method comprising the following steps:

exchanging between the first and second entity, to establish the state channel according to a peer-to-peer protocol for decentralized identifiers for the first and the second entity, a respective new decentralized identifier as a respective user identifier, and a respective public key for the respective user identifier, from each of the first and the second entity; and securing an exchange of messages containing pieces of information characterizing states between the first and the second entity using the respective user identifiers and the respective public keys.

2. The method as recited in claim 1, wherein the respective user identifiers and the respective public keys are each part of a particular data set for decentralized communication of the first and second entity and are exchanged as part of the data set.

3. The method as recited in claim 1, wherein to establish the state channel, initially the first entity sends an invitation to establish the state channel to the second entity.

4. The method as recited in claim 3, wherein the second entity, upon the invitation, when the state channel is to be established, sends a connection request, including the respective user identifier and the respective public key of the second entity, to the first entity.

5. The method as recited in claim 4, wherein the first entity, upon receipt of the connection request, sends a response, including the respective user identifier and the respective public key of the first entity, to the second entity.

6. The method as recited in claim 1, wherein the respective public key is used in each case as the respective user identifier.

7. The method as recited in claim 1, wherein messages relating to the state channel are exchanged in a secured manner between the first entity and the second entity.

8. The method as recited in claim 1, wherein the first entity and/or the second entity is a computer system including a communication interface.

9. A computer system including a communication interface, the computer system possessing a decentralized identifier and instructions for handling the decentralized identifier in a network, and the computer system is configured to provide a state channel with another computer system including a second communication interface via the network, the other computer system also possessing a decentralized identifier and instructions for handling the decentralized identifier of the other computer system in the network, wherein the computer system, for establishing the state channel is configured, according to a peer-to-peer protocol for decentralized identifiers, to transfer a new decentralized identifier as a user identifier and a public key for the user identifier to the other computer system and to receive a decentralized identifier as a user identifier and a public key of the other computer system, and to secure a message exchange relating to the state channel with the other computer system using the user identifiers and the public keys.

10. A network including a first computer system and a second computer system which each include a communication interface, wherein the first and second computer systems are configured to provide a state channel between the first computer system and the second computer system in the network for exchanging messages relating to transactions of a distributed ledger technology, wherein the first computer system and the second computer system each possess a decentralized identifier and instructions for handling the decentralized identifier in the network, the first and second computer systems configured to:

exchange between the first and second computer system, to establish the state channel according to a peer-to-peer protocol for decentralized identifiers for the first and the second entity, a respective new decentralized identifier as a respective user identifier, and a public key for the respective user identifier, from each of the first and the second computer systems; and secure an exchange of messages containing pieces of information characterizing states between the first and the second computer system using the user identifiers and the public keys.

11. A non-transitory machine-readable memory medium on which is stored a computer program for providing a state channel between a first entity and a second entity in a network for exchanging messages relating to transactions of a distributed ledger technology, wherein the first entity and the second entity each possess a decentralized identifier and instructions for handling the decentralized identifier in the network, the computer program, when executed by a computer system, causing the computer system to perform:

sending from the first entity to the second entity, to establish the state channel according to a peer-to-peer protocol for decentralized identifiers for the first and the second entity, a first respective new decentralized identifier as a respective user identifier of the first entity, and a public key of the first entity for the respective user identifier of the first entity, and receiving, from the second entity by the first entity, a second respective new decentralized identifier as a respective user identifier of the second entity, and a public key of the second entity for the respective user identifier of the second entity; and securing an exchange of messages containing pieces of information characterizing states between the first entity and the second entity using the respective user identifiers and the respective public keys.

\* \* \* \* \*